United States Patent
Xiong et al.

(10) Patent No.: US 10,774,908 B2
(45) Date of Patent: Sep. 15, 2020

(54) ROBOT AND HEAD THEREOF

(71) Applicant: UBTECH Robotics Corp, Shenzhen (CN)

(72) Inventors: Youjun Xiong, Shenzhen (CN); Xinpu Chen, Shenzhen (CN); Zuyi Mao, Shenzhen (CN); Gao Yang, Shenzhen (CN); Defu Liu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 85 days.

(21) Appl. No.: 16/288,117

(22) Filed: Feb. 28, 2019

(65) Prior Publication Data

US 2020/0182336 A1 Jun. 11, 2020

(30) Foreign Application Priority Data

Dec. 11, 2018 (CN) .......................... 2018 1 1512893

(51) Int. Cl.
| | |
|---|---|
| *A63H 3/00* | (2006.01) |
| *F16H 21/32* | (2006.01) |
| *F16H 19/00* | (2006.01) |
| *B25J 9/10* | (2006.01) |
| *B25J 9/12* | (2006.01) |

(52) U.S. Cl.
CPC .............. *F16H 21/32* (2013.01); *B25J 9/102* (2013.01); *B25J 9/126* (2013.01); *F16H 19/001* (2013.01)

(58) Field of Classification Search
CPC ....... A63H 3/365; A63H 13/005; B25J 9/102; A42B 1/065; A42B 1/064; A42B 3/224; A42B 3/222; A42B 3/221; A42B 3/225; A42B 3/226; A42B 3/227
See application file for complete search history.

(56) References Cited

U.S. PATENT DOCUMENTS

| | | | | |
|---|---|---|---|---|
| 3,852,911 A | * | 12/1974 | Sapkus ................. | A63H 13/06 446/365 |
| 4,546,498 A | * | 10/1985 | Fantin .................... | A42B 3/224 2/424 |
| 5,902,169 A | * | 5/1999 | Yamakawa .............. | A63H 3/48 446/337 |
| 6,604,975 B1 | * | 8/2003 | Yeh ......................... | A41G 7/02 2/206 |
| 2010/0048092 A1 | * | 2/2010 | Kenney ................. | A63H 13/06 446/334 |
| 2011/0302701 A1 | * | 12/2011 | Kuo ....................... | A42B 3/326 2/421 |
| 2015/0017876 A1 | * | 1/2015 | Russo .................... | A63H 11/10 446/484 |
| 2017/0329139 A1 | * | 11/2017 | Shearman ............... | G02B 5/20 |
| 2018/0042328 A1 | * | 2/2018 | Pryor ..................... | A42B 3/042 |
| 2018/0168269 A1 | * | 6/2018 | Di Troia ................ | A42B 3/226 |
| 2019/0105783 A1 | * | 4/2019 | Al Moubayed ...... | A63H 13/005 |

* cited by examiner

*Primary Examiner* — Richard W Ridley
*Assistant Examiner* — Brian J McGovern

(57) ABSTRACT

A head of a robot includes a head housing, a lace panel connected to the head housing, a mask moveably connected to the head housing, a mounting frame arranged within the head housing, a first servo connected to the mounting frame, and a first transmission mechanism to transmit motion from the first servo to the mask so as to move the mask between a first position where the mask covers the face panel and a second position where the mask is lifted to expose the face panel.

10 Claims, 8 Drawing Sheets

ROBOT AND HEAD THEREOF

CROSS REFERENCE TO RELATED APPLICATIONS

This application claims priority to Chinese Patent Application No. 201811512893.2, filed Dec. 11, 2018, which is hereby incorporated by reference herein as if set forth in its entirety.

BACKGROUND

1. Technical Field

The present disclosure generally relates to robots, and particularly to a robot and a head thereof.

2. Description of Related Art

Domestic robots are becoming more common as robot technology develops, and they have an extremely wide range of functions. Some domestic humanoid robots include two servos at their necks, which enables heads of the robots to have two degrees of freedom, i.e. forward backward tilting and left/right rotation. It is useful and desirable to provide a new robot having a head with one or more features.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
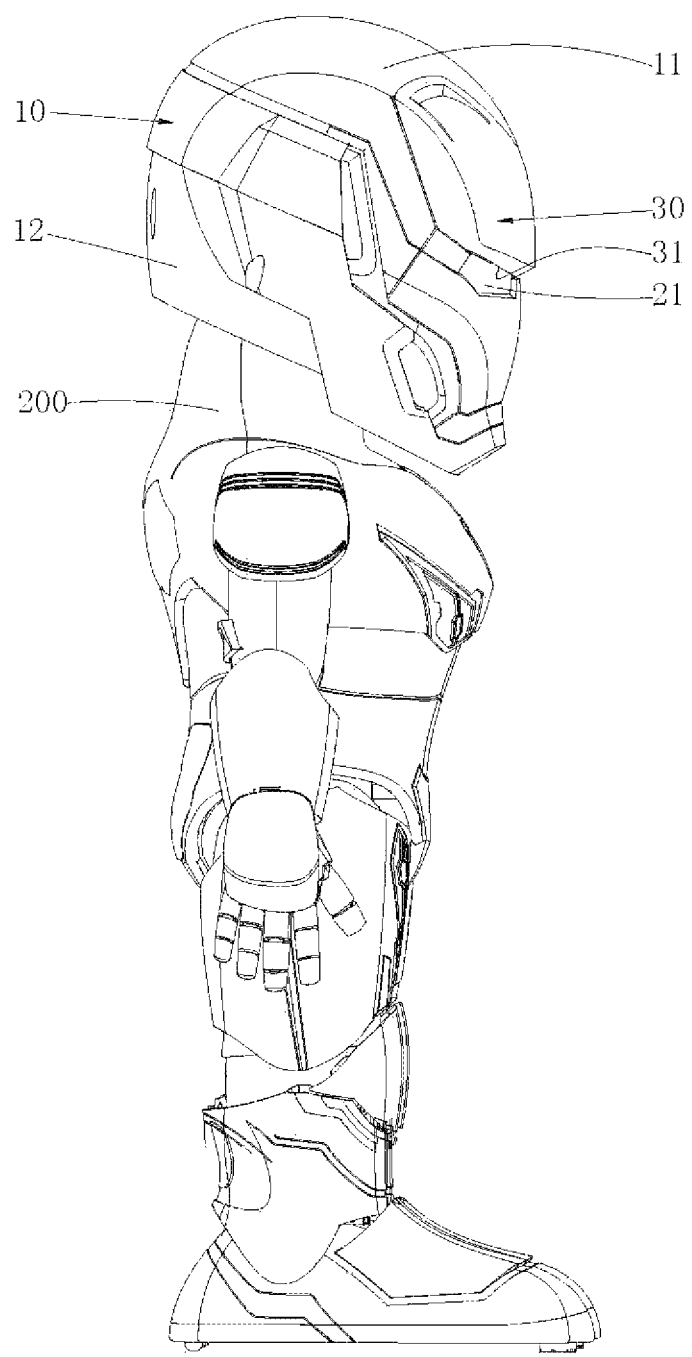
FIG. 1 is an isometric view of a robot according to an embodiment.
Figure 2:
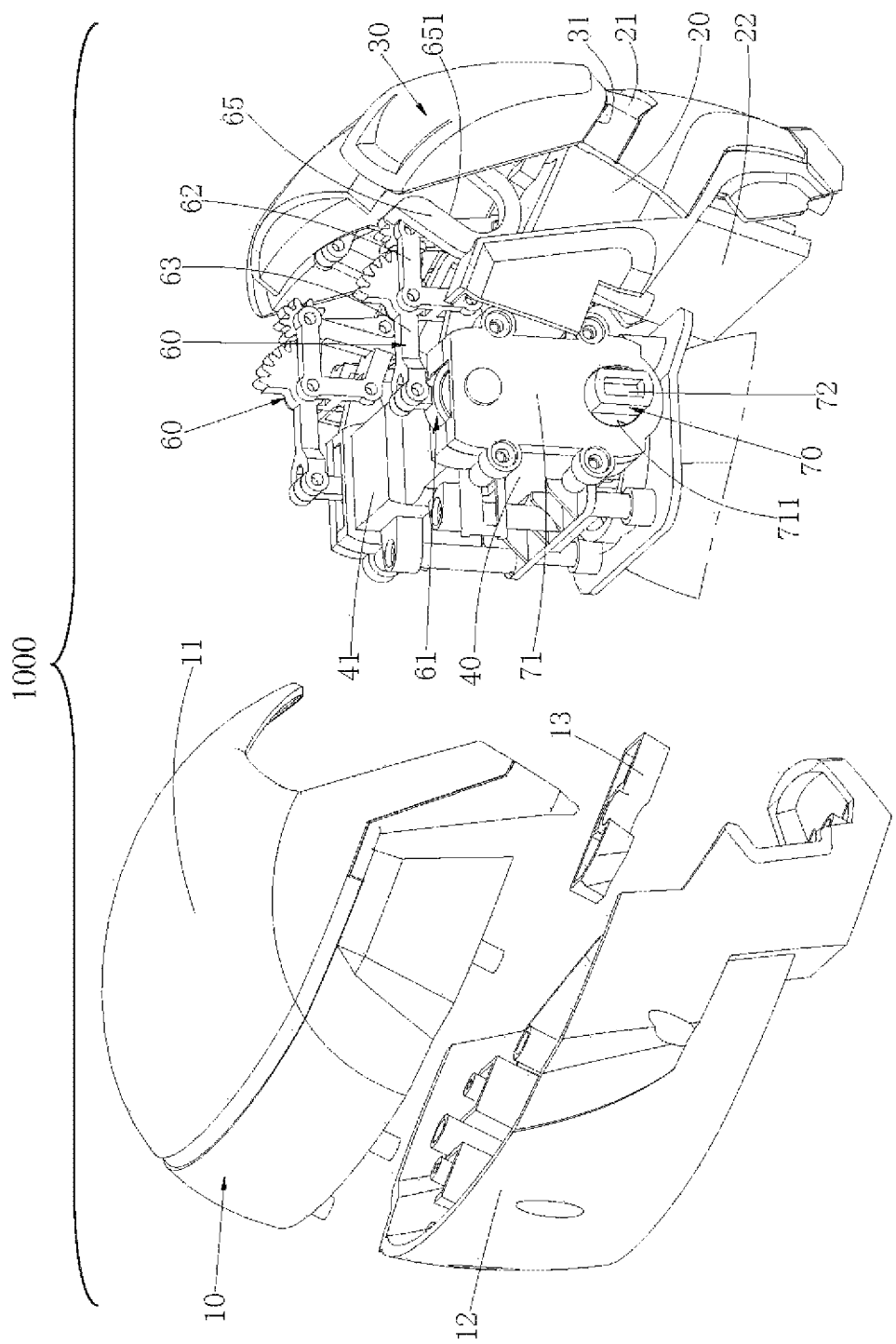
FIG. 2 is an isometric exploded view of a head of the robot of FIG. 1.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-4, in one embodiment, a head 1000 of a robot includes a head housing 10, a face panel 20 connected to the head housing 10, a mask 30 movably connected to the head housing 10, a mounting frame 40 arranged within the head housing 10, a first servo 50 mounted to the mounting frame 40, and a first transmission mechanism 60 to transmit motion from the first servo 50 to the mask 30 so as to move the mask 30 between a first position where the mask 30 covers the face panel 20 and a second position where the mask 30 is lifted to expose the face panel 20.

With such configuration, the head has a feature of a movable mask, which enriches the functionality of the robot.

The bead housing 10 includes a top housing 11 and a bottom housing 12 which are connected to each other. The top housing 11 and the bottom housing 12 thrill a space for mounting therein the mounting frame 40, the first transmission mechanism 60, and a second transmission mechanism 70, and can protect each component therein. The mounting frame 40 has an opening, and the opening covered by a top cover 41 (see FIG. 2). The face panel 20 has two eyes 21, and the mask 30 is provided with through holes 31 sized and arranged according to the eyes 21. The mask 30 can cover the face panel 20. The inside of the face panel 20 is provided with a display 22 which is fixed to the head housing 10. After the mask 30 is lifted, the content, such as expression animation, on the display 22 can be observed. The first servo 50 is connected to a main control processor in the robot, and executes motion command from the main control processor to rotate the output shaft of the servo.

Figure 3:
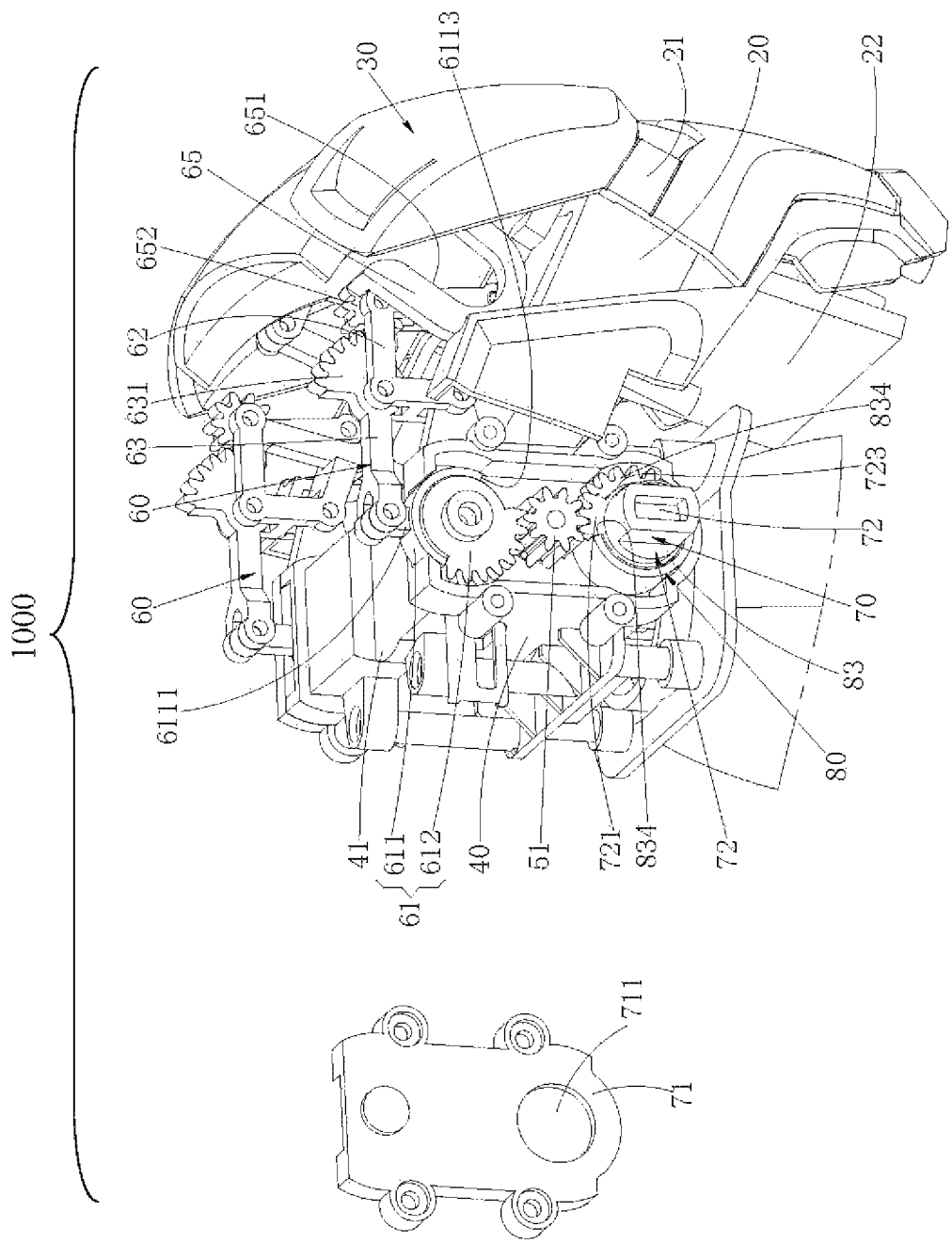
FIG. 3 is an isometric exploded view of a head of the robot of FIG. 1, with a head housing omitted.
Figure 5:
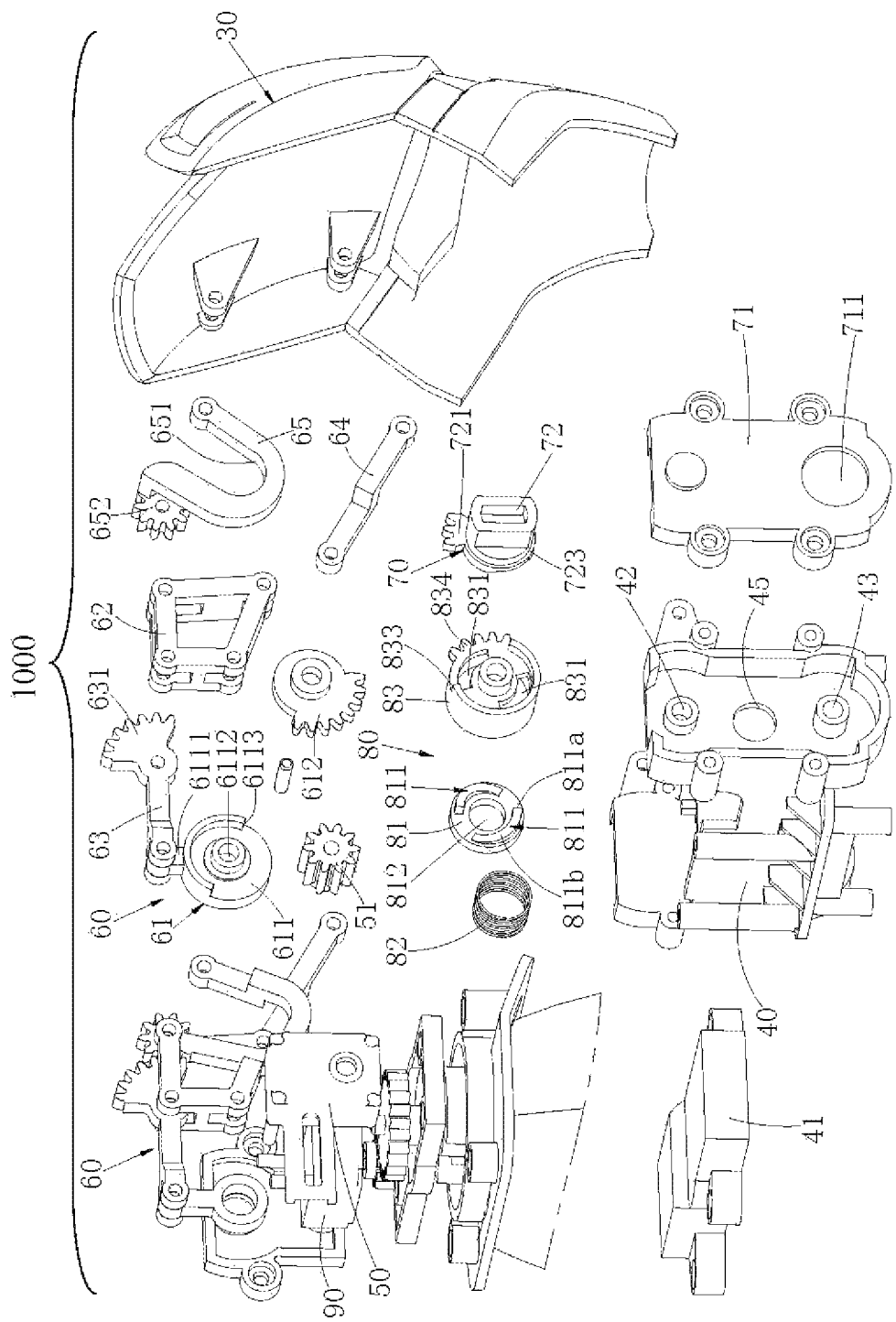
FIG. 5 is an isometric exploded view of a head of the robot of FIG. 1, with a head housing and a face panel omitted.
Figure 7:
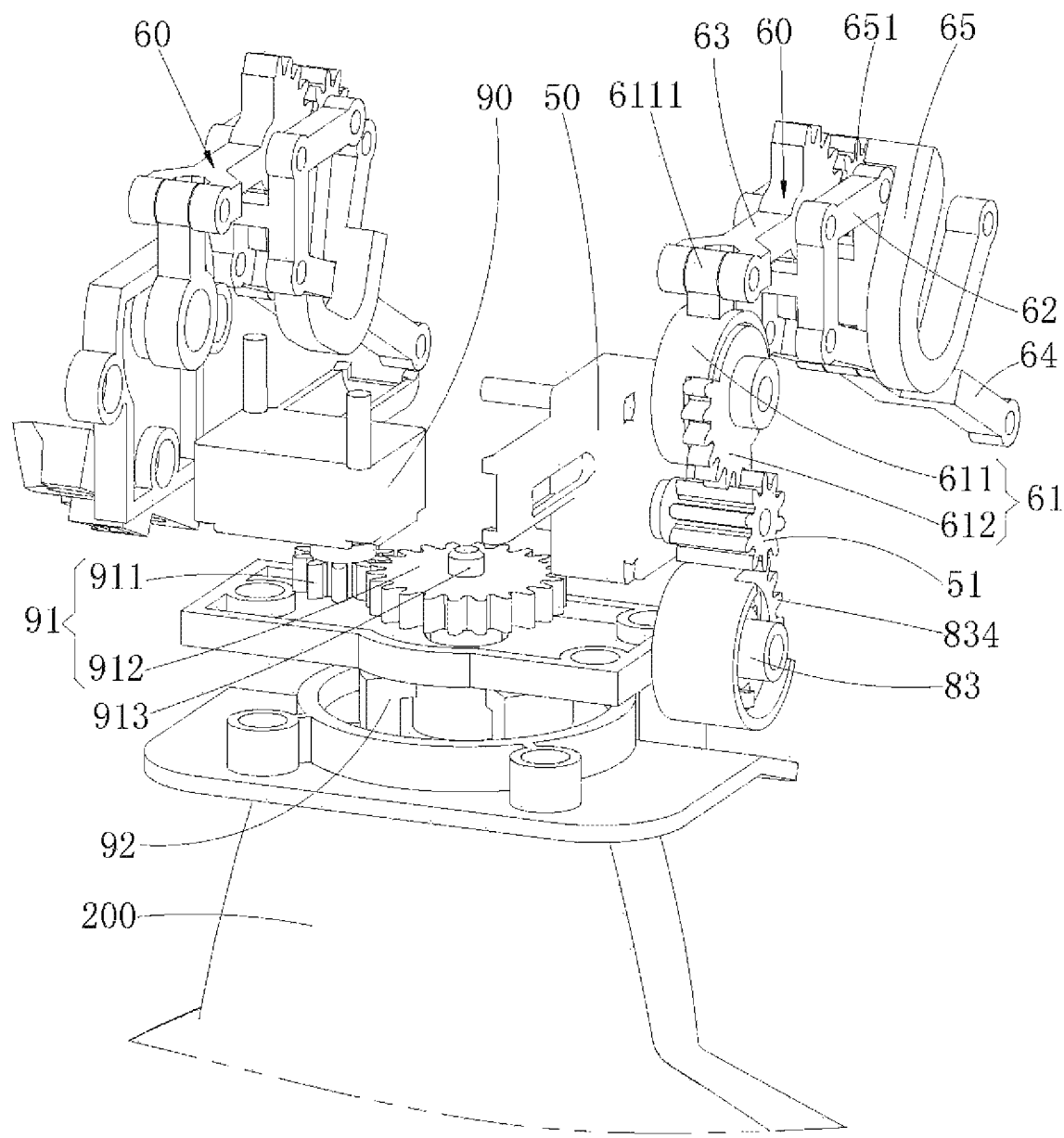
FIG. 7 is an isometric view of the head of FIG. 4, with a mask, a mounting frame and a mounting casing removed.
Figure 8:
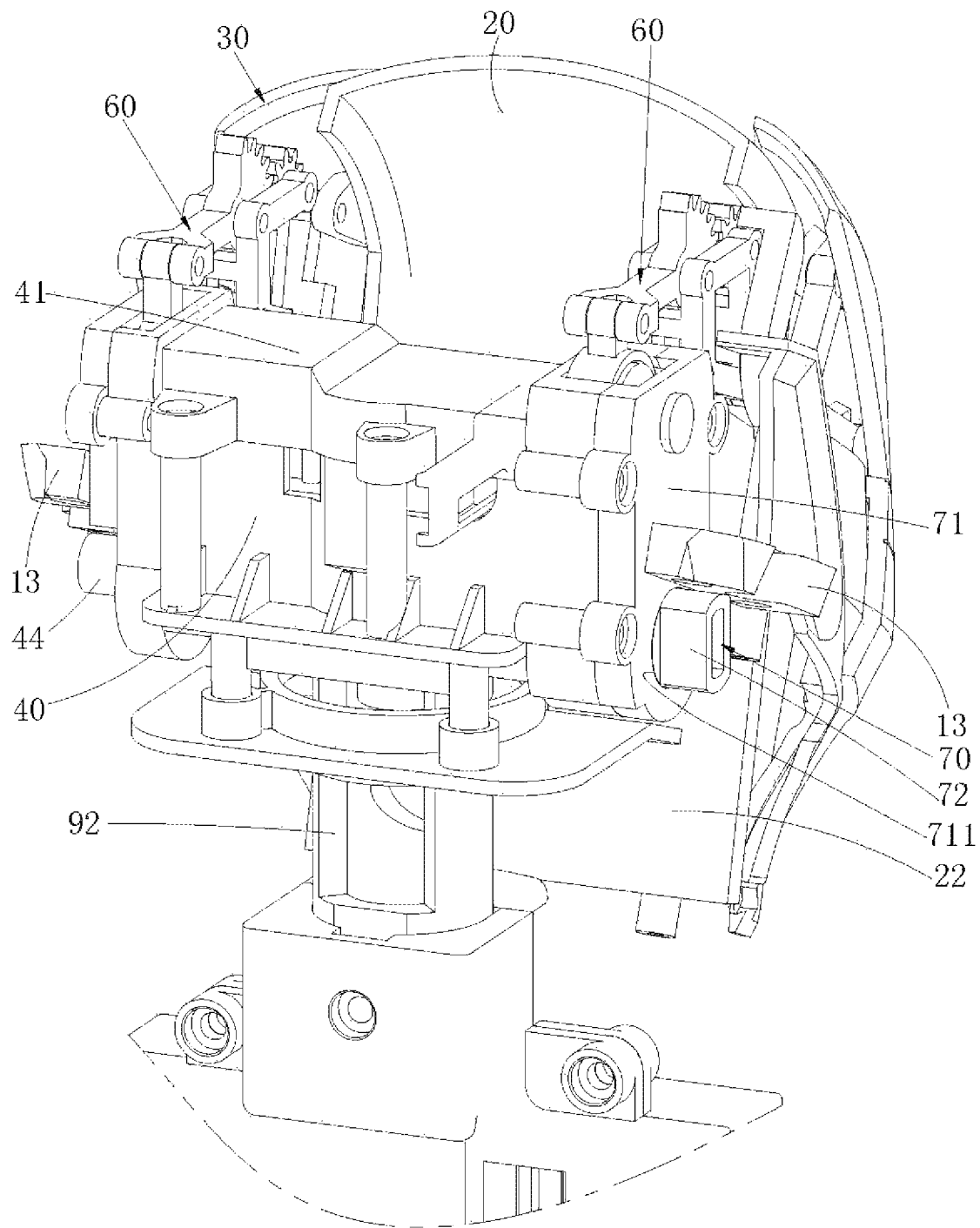
FIG. 8 is a partially isometric view of the robot of FIG. 1, with a head housing removed.

Referring to FIGS. 5, 7 and 8, in one embodiment, the first servo 50 has an output shaft and a first output gear coaxially connected to the output shaft. The first transmission mechanism 60 a rotating member 61 rotatably connected to the mounting frame 40, an intermediate linking member 62 rotatably connected to the mounting frame 40, a first linkage bar 63 having two opposite ends rotatably connected to the rotating member 61 and the intermediate linking member 62, a second linkage bar 64 having two opposite ends rotatably connected to the mask 30 and the intermediate linking member 62, and a third linkage bar 65 having two opposite ends rotatable connected to the mask 30 and the intermediate linking member 62. The rotating member 61 includes a first gear 619 engaged with the first output gear 51. In the embodiment, in order to save space, the first tear is a gear segment. The first transmission mechanism 60 transmits motion to the mask 30 such that the mask 30 can cover the face panel 20 and move relative to the face panel 20. As shown in FIG. 5, the output shaft of the first servo 50 extends in the horizontal direction. The output shaft of the first servo 50 passes through a through hole 45 in the mounting frame 40. Motion from the output shaft of the first servo 50 is transmitted, through the first output gear 51, the rotating member 61, the first linkage bar 63, the intermediate linking member 62, the second linkage bar 64 and the third linkage bar 65 to the mask 30, so that the mask 30 can move upward and expose the face panel 20. The intermediate linking member 62 is quadrilateral, and four vertices thereof are pivotally connected to the first linkage bar 63, the mounting frame 40, the second linkage bar 64, and the third linkage bar 65, respectively. Referring to FIG. 3, when the first servo 50 outputs a clockwise rotation as controlled by the main control processor, the rotating member 61 drives the first link 63 to move, to the left, thereby pulling the intermediate linking member 62 to move to the left. The third linkage bar 65 then rotates counterclockwise and drives the mask 30 to move upward. When the first servo 50 outputs a counterclockwise direction rotation, the mask 30 can move from the lifted position to its original position to cover the face panel 20. In the embodiment, two first transmission mechanisms 60 are arranged at opposite sides of the mounting frame 40. The rotating member 61 in the other first transmission mechanism 60 only includes a main body 611 and does not include the first gear 612. Such configuration enables the mask 30 to be stably moved upward and downward.

Figure 6:
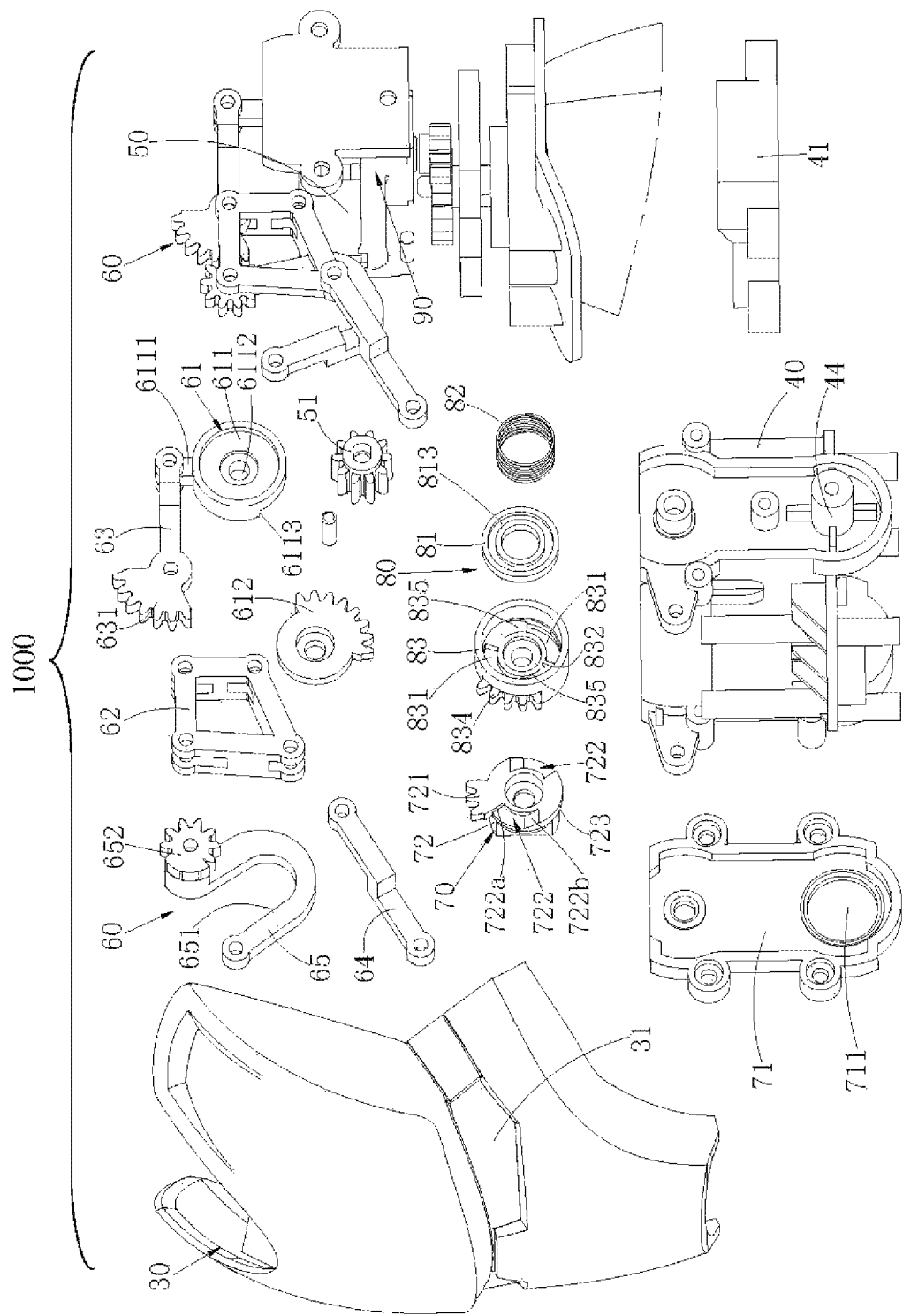
FIG. 6 is similar to FIG. 5, but viewed from a different perspective.

Referring to FIGS. 3 and 5-6, in one embodiment, the rotating member 61 includes a main body 611 and a first gear 612. The main body 611 has a joint portion 6111 pivotally connected to the first linkage bar 63. The main body 611 is coaxial with the first gear 612. The first gear 612 is rotatably connected to the main body 611. The second transmission mechanism 70 includes a mounting casing 71 connected to the mounting frame 40. The sidewall of the mounting easing 71 has a first shaft 42 for mounting the main body 611 thereon. The first shaft 42 passes through a mounting hole 6112 of the main body 611 to pivotally connect the main body 611 to the mounting frame 40. The main body 611 has a stopper wall 6113 protruding from a side thereof. The stopper wall 6113 extends circumferentially along the edge of the main body 611. Initially, there is a circumferential gap between the stopper wall 6113 and one end face of the first gear 612. When the first servo 50 drives the first output gear 51 to rotate, motion colon is transmitted out through the first transmission mechanism 60 and the second transmission mechanism 70. The second transmission mechanism 70 is used to transmit motion from the first servo 50 to the head housing 10 to enable flexion or extension of the head housing 10. After the first output gear 51 starts to rotate, the first output gear 51 is engaged with the second transmission mechanism 70 to drive the head housing 10 to a predetermined position. Meanwhile, the first gear 612 is meshed with the first output gear 51, and the first gear 612 rotates. At this time, the mask 30 will not be lifted. As the first output gear 51 rotates, an end face of the first gear 612 gradually approaches the stopper wall 6113. After the end face of the first gear 612 abuts against the stopper wall 6113, and further rotation of the first gear 612 will push the main body 611 of the rotating member 61 to rotate, which causes the first transmission mechanism 60 to start to operate. With such configuration, the mask 30 will move upwards after the head housing 10 is lifted to a certain extent.

Referring to FIGS. 3 and 5, in one embodiment, the third linkage bar 65 is U-shaped and defines a space 651 so as not to interfere with the head housing 10. When the mask 30 covers the face panel 20, a pivot axis between the third linkage bar 65 and the intermediate linking member 62 is located above a pivot axis between the second linkage bar 64 and the intermediate linking member 62. A pivot axis between the third linkage bar 65 and the mask 30 is located above a pivot axis between the second linkage bar 64 and the mask 30. When the mask 30 moves upward, the third linkage bar 65 moves toward an edge of the head housing 10. As the third linkage bar 65 approaches the head housing 10, the edge of the head housing 10 is gradually received in the space 651, which avoids interference of the third linkage bar 65 with the edge of the head housing 10. The mask 30 can then be lilted and move to a position that is above the top of the head housing 10.

Referring to FIGS. 3 and 5, in one embodiment, the first linkage bar 63 includes a first gear tooth portion 631 adjacent to the third linkage bar 65. The third linkage bar 65 includes a second gear tooth portion 652 adjacent to the first linkage bar 63. The first gear tooth portion 631 is engaged with the second gear tooth portion 652. In the embodiment, the first gear tooth portion 631 and the second gear tooth portion 652 are both gear segments. The diameter of the first gear tooth portion 631 is greater than the diameter of the second gear tomb portion 652. The first gear tooth portion 631 and the second gear tooth portion 652 form a speed increasing mechanism, so that the mask 30 can move up and down quickly.

Referring to FIG. 3, motion from the first servo 50 can be transmitted trough the second transmission mechanism 70 to the head housing 10 to enable upward and downward rotation of the head housing 10 relative to the mounting frame 40, i.e. flexion and extension of the head housing 10.

Referring to FIG. 3, in one embodiment, the second transmission mechanism 70 include the mounting casing 71, a driving shaft 72 received in the mounting casing 71 and coupled to the head housing 10, and a limiting mechanism 80. The driving shaft 72 includes a second gear 721 engaged with the first output gear 51. The second gear 721 is a gear segment. Such configuration can achieve flexion and extension of the head 1000 of the robot and serves as a stopper to stop further rotation of the head 1000 after it has rotated toward the ground to a predetermined position. The output shaft of the first servo 50 enters into the mounting casing 71. The driving shaft 72 passes through a mounting hole 711 of the mounting casing 71. A limiting ring 723 of the driving shall 72 abuts against the inner wall of the mounting casing 71, which prevent an axial movement of the driving shaft 72 with respect to the mounting casing 71. The end of the driving shall 72 that is located outside the mounting casing 71 is connected to head housing 10. In the embodiment, the end of the driving shaft and the head housing 10 are connected to each other by profile shaft connection that is a connection technique that uses a shaft and a shaft hole both having non-circular shaped cross-section to replace the combination of spline and key. The mounting frame 40 is provided with a connecting shaft 44 on the other side of opposite the driving shaft 72. The connecting shaft 44 is coaxial with the driving shaft 72. The head housing 10 is rotatably connected to the connecting shall 44 and can flex and extend relative to the mounting frame 40. The head housing 10 defines shaft holes for fitting the driving shaft 72 and the connecting shaft 44 therein, respectively. The opening of each shaft hole is covered by a cover 13, so that the driving shaft 72 and the connecting shall 44 are reliably held in the shaft holes. When the first output gear 51 of the first servo 50 rotates, and the second gear 721 meshes with the first output gear 51, so that the driving shaft 72 rotates accordingly and drives the head housing 10 to rotate, thereby achieving flexion/extension of the head 1000 of the robot. The number of teeth of the second gear 721 determines the range of rotation of the head housing 10. The first output gear 51, the rotating member 61, and the limiting mechanism 80 are all mounted in the mounting casing 71.

Referring to FIGS. 3 and 6, in one embodiment, the limiting mechanism 80 includes a limiting member 81 that includes a protrusion 811, an elastic member 82 compressed between the limiting member 81 and the mounting frame 40, and a holder 83 defining a through hole 831 and a cavity 832. The limiting member 81 is received in the cavity 832 and the protrusion 811 can pass through the through hole 831. The limiting member 81, the holder 83 and the driving shaft 72 are coaxial with one another. The holder 83 is received in the mounting casing 71, and the driving shaft 72 defines a concavity 722 to receive the protrusion 811. The limiting member 81 is a flat disc. The mounting frame 40 includes a second shaft 43 that passes through a through hole 812 of the limiting member 81. The limiting member 81 is connected to and slidable with respect to the mounting frame 40. The concavity 832 is shaped and sized according to the limiting member 81. The limiting member 81 defines a groove 813 to receive an end of the elastic member 82. The elastic member 82 in the embodiment is a coil spring. The protrusion 811 and the concavity 722 both include an inclined portion extending circumferentially. Referring to FIGS. 3 and 5, when the driving shad 72 rotates in a counterclockwise direction, the head housing 10 is driven to rotate upward. When the first output gear 51 rotates in a counterclockwise direction and meshes with the driving shad 72, the driving shad 72 rotates in a clockwise direction and the head housing 10 is driven to rotate downward. Specifically, when the first output gear 51 rotates in a counterclockwise direction and meshes with the holder 83, the holder 83 rotates in a clockwise direction. After the holder 83 rotates to a position where the through hole 831 face directly the protrusion 11 and the protrusion 11 moves toward the holder 83 as pushed by the elastic member 82 and passes through the through hole 831. When the first output gear 51 rotates further and meshes with the driving shaft 72, the driving shad 72 rotates in a clockwise direction. When one end of the concavity 722 of the driving shaft 72 comes into contact with an end of the protrusion 811, further rotation of the driving shaft 72 in the clockwise direction is stopped. As a result, the flexion of the head 1000 of the robot is stopped. In one embodiment, there are two protrusions 811 and two concavities 722 and two through holes 831 arranged accordingly.

Figure 4:
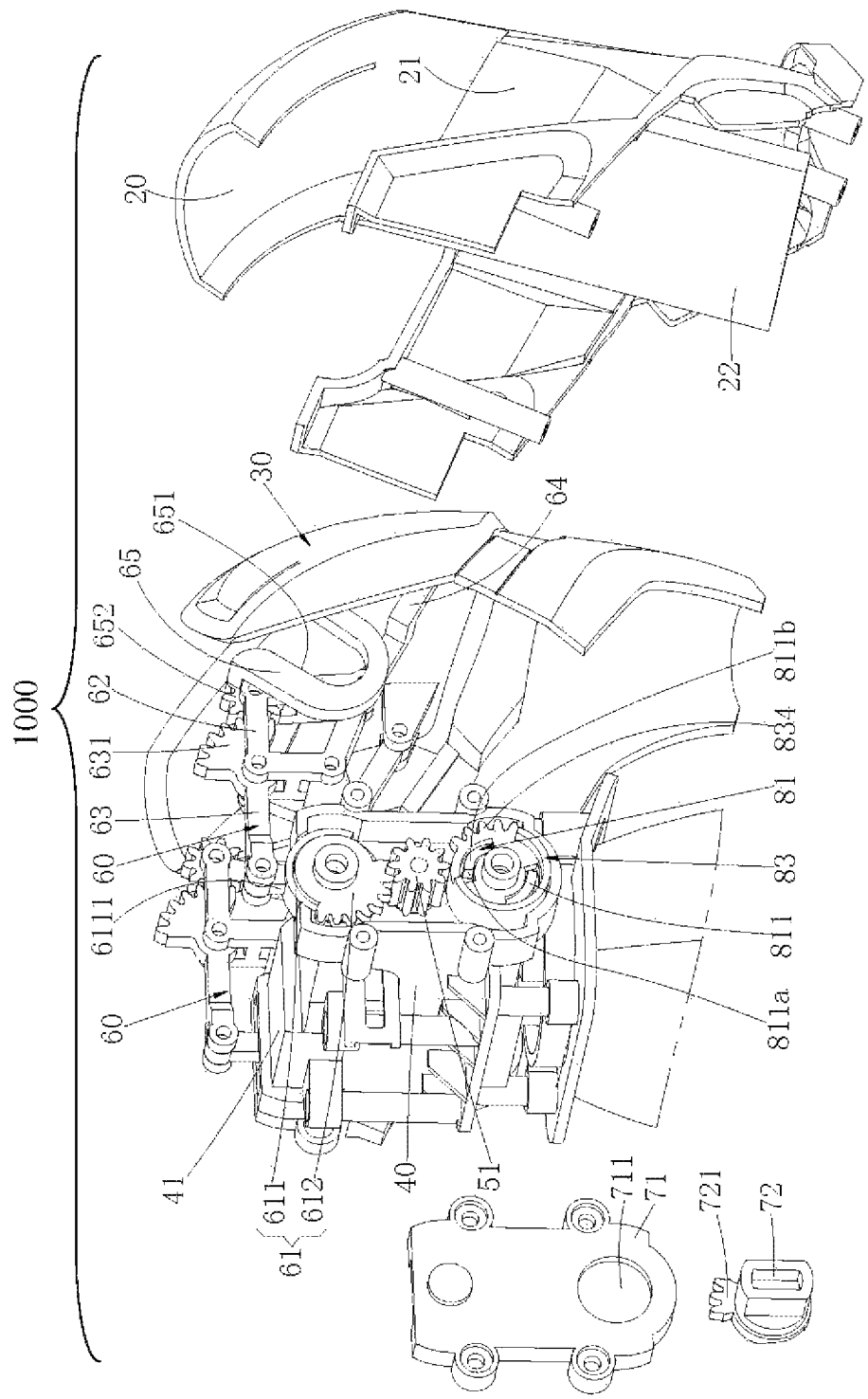
FIG. 4 is an isometric exploded view of a head of the robot of FIG. 1, with a head housing omitted.

Referring to FIGS. 3-5, in one embodiment, the holder 83 includes a shoulder 833 to engage with the driving shall 72 such that the holder 83 can rotate together with the driving shaft 72. The holder 83 includes a third gear 834 to engage with the first output gear 51. In the embodiment, the third gear 834 is a gear segment. The holder 83 includes a sloped surface 835 at the bottom of the cavity 832. When the First output gear 51 drives the third gear 834 to rotate, from the position shown in FIG. 4, in a counterclockwise direction, the sloped surface 835 approaches the protrusion 811. When the sloped surface 835 comes into contact the protrusion 811, the protrusion 811 is pushed to move axially away from the driving shaft 72. When the driving shaft 72 comes into contact with the shoulder 833, the second gear 721 and the third gear 834 are circumferentially adjacent to each other in such a way that when one of the second gear 721 and the third gear 834 disengages from the first output gear 51, the other one comes into engagement with the first output gear 51. Referring to FIG. 3, when the first output gear 51 engages with the second gear 721 and one end of the second gear 721 abuts against the shoulder 833, counterclockwise rotation of the second gear 721 will drive the holder 83 to rotate together with the second gear 721. After the first output gear 51 disengages from the second gear 721 and comes into engagement with the third gear 834, rotation of the driving shaft 72 stops and extension of the head 1000 of the robot is stopped. After the first output gear 51 comes into engagement with the third gear 834, the holder 83 continues rotating in a counterclockwise direction. As the holder 83 rotates, the sloped surface 835 contact the protrusion 81 and push the protrusion 81 to move axially away from the driving shaft 72. After the protrusion 81 moves out of the concavity 722 of the driving shaft 72, the driving shaft 72 is freed from the restriction of the protrusion 81. In one embodiment, there are two protrusions 811 and two sloped surfaces 835 sized and arranged according to the protrusions 811.

In one embodiment, the protrusion 811 includes a first end face 811a and a first inclined surface 811b that intersects with the first end face 811a and faces the driving shaft 72. The driving shaft 72 includes a second end face 722a and a second inclined surface 722b in a side facing the protrusion 811. The second end face 722a intersects with the second inclined surface 722b. When the second gear 721 rotates in a counterclockwise direction as driven by the first output gear 51 and the second inclined surface 722b comes into contact with the first inclined surface 811b, the protrusion 811 is pushed to move axially away from the driving shaft 72. When the protrusion 811 moves into the concavity 722 as pushed by the elastic member 82 and the first end face 811a abuts against the second end face 722a, the driving shaft 72 is stopped from rotating in the counterclockwise direction.

Referring to FIGS. 7 and 8, in one embodiment, the head 1000 further includes a second servo 90 mounted to the mounting frame 40, a third transmission mechanism 91 to transmit motion from the second servo 90 to the mounting frame 40 so that the mounting frame 40 can rotate to the right/left, and a support post 92 fixed to a frame in the chest of the robot. The third transmission mechanism. 91 includes a second output gear 911 coaxially coupled to the output shaft of the second servo 90, a transmission gear 912 that meshes with the second output gear 911 and is coaxially fixed to the support post 92. Such a configuration enables the left and right rotation of the head housing 10 relative to the body of the robot. The second servo 90 is connected to the main control processor in the robot, and executes the motion command from the main control processor to rotate its output shaft. The transmission gear 912 is fixed to the support post 92 by a mounting shaft 913. The rotation of the output shaft of the second servo 90 drives the second output gear 911 and the transmission gear 912 to rotate, thereby realizing the bead turning. A lower end of the support post 92 is located within the body 200 of the robot.

In one embodiment, a robot includes a head as described above. The mask 30 is movably mounted to the head housing 10, and motion from the first servo 50 is transmitted to the mask 30 through the first transmission mechanism 60 so that the mask 30 can cover or be move away from the face panel 20.

Although the features and elements of the present disclosure are described embodiments in particular combinations, which feature or element can be used alone or in other various combinations within the principles of the present disclosure to the full extent indicated by the broad general meaning of the terms in which the appended claims are expressed.

What is claimed is:
1. A head of a robot comprising:
a head housing;
a face panel connected to the head housing;
a mask moveably connected to the head housing;
a mounting frame arranged within the head housing;

a first servo connected to the mounting frame; and
a first transmission mechanism configured to transmit motion from the first servo to the mask so as to move the mask between a first position where the mask covers the face panel and a second position where the mask is lifted to expose the face panel;
a second transmission mechanism configured to transmit motion from the first servo to the head housing to enable flexion or extension of the head housing relative to the robot.

2. The head according to claim 1, further comprising a first output gear, wherein the first servo comprises an output shaft, the first output gear is coaxially connected to the output shaft, the first transmission mechanism comprises a rotating member rotatably connected to the mounting frame, an intermediate linking member rotatably connected to the mounting frame, a first linkage bar comprising two opposite ends rotatably connected to the rotating member and the intermediate linking member, a second linkage bar comprising two opposite ends rotatably connected to the mask and the intermediate linking member, and a third linkage bar comprising two opposite ends rotatably connected to the mask and the intermediate linking member, and the rotating member comprise a first gear engaged with the first output gear.

3. The head according to claim 2, wherein the third linkage bar is U-shaped, a pivot axis between the third linkage bar and the intermediate linking member is located above a pivot axis between the second linkage bar and the intermediate linking member, and a pivot axis between the third linkage bar and the mask is located above a pivot axis between the second linkage bar and the mask.

4. The head according to claim 3, wherein the first linkage bar comprises a first gear tooth portion adjacent to the third linkage bar, the third linkage bar comprises a second gear tooth portion adjacent to the first linkage bar, the first gear tooth portion is engaged with the second gear tooth portion.

5. The head according to claim 1, further comprising a first output gear, wherein the first servo comprises an output shaft, the first output gear is coaxially connected to the output shaft, the second transmission mechanism comprises a mounting casing connected to the mounting frame, a driving shaft received in the mounting casing and coupled to the head housing, and a limiting mechanism, and the driving shaft comprises a second gear engaged with the first output gear.

6. The head according to claim 5, wherein the limiting mechanism comprises a limiting member that comprises a protrusion, an elastic member compressed between the limiting member and the mounting casing, and a holder defining a cavity and a through hole, the limiting member is received in the cavity and the protrusion passes through the through hole, the limiting member, the holder and the driving shaft are coaxial with one another, the holder is received in the mounting casing, the driving shaft defines a concavity to receive the protrusion, the protrusion is movable in the concavity, when the protrusion comes into contact with an end of the concavity, rotation of the driving shaft is stopped.

7. The head according to claim 6, wherein the holder comprises a shoulder configured to engage with the driving shaft such that the holder rotates together with the driving shaft, the holder comprises a sloped surface in the cavity, when the first output gear drives the third gear to rotate in a counterclockwise direction and the sloped surface stays in contact the protrusion, the protrusion is pushed to move axially away from the driving shaft, when the driving shaft comes into contact with the shoulder, the second gear and the third gear are circumferentially adjacent to each other.

8. The head according to claim 6, wherein the protrusion comprises a first end face and a first inclined surface that intersects with the first end face and faces the driving shaft, the driving shaft comprises a second end face and a second inclined surface in a side facing the protrusion, the second end face intersects with the second inclined surface, when the second gear rotates in a counterclockwise direction as driven by the first output gear and the second inclined surface comes into contact with the first inclined surface, the protrusion is pushed to move axially away from the driving shaft; when the protrusion moves into the concavity as pushed by the elastic member and the first end face abuts against the second end face, the driving shaft is stopped from rotating in the counterclockwise direction.

9. The head according to claim 1, further comprising a second servo mounted to the mounting frame, a third transmission mechanism to transmit motion from the second servo to the mounting frame to rotate the mounting frame to the right and left, and a support post fixed to a frame in a chest of the robot, the third transmission mechanism comprises a second output gear coaxially coupled to an output shaft of the second servo, and a transmission gear that meshes with the second output gear and is coaxially fixed to the support post.

10. A robot comprising a head, the head comprising:
a head housing;
a face panel connected to the head housing;
a mask moveably connected to the head housing;
a mounting frame arranged within the head housing;
a first servo connected to the mounting frame; and
a first transmission mechanism configured to transmit motion from the first servo to the mask so as to move the mask between a first position where the mask covers the face panel and a second position where the mask is lifted to expose the face panel;
a second transmission mechanism configured to transmit motion from the first servo to the head housing to enable flexion or extension of the head housing relative to the robot.

* * * * *